United States Patent
Ishii (10) Patent No.: US 8,279,323 B2
(45) Date of Patent: Oct. 2, 2012

(54) IMAGE CAPTURING APPARATUS AND CONTROL METHOD FOR THE SAME

(75) Inventor: Kazunori Ishii, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 474 days.

(21) Appl. No.: 12/482,520

(22) Filed: Jun. 11, 2009

(65) Prior Publication Data
US 2009/0322933 A1    Dec. 31, 2009

(30) Foreign Application Priority Data
Jun. 30, 2008   (JP) .................................. 2008-171235

(51) Int. Cl.
*G03B 13/00* (2006.01)

(52) U.S. Cl. ........ 348/345; 348/349; 348/353; 348/354; 348/356; 396/89

(58) Field of Classification Search .......... 348/345–357; 396/89
See application file for complete search history.

(56) References Cited

U.S. PATENT DOCUMENTS

| | | | |
|---|---|---|---|
| 2006/0182433 A1* | 8/2006 | Kawahara et al. | 396/123 |
| 2008/0080739 A1* | 4/2008 | Muramatsu | 382/103 |

FOREIGN PATENT DOCUMENTS

| | | | |
|---|---|---|---|
| JP | 02217075 A | * | 8/1990 |
| JP | 2001-215403 | | 8/2001 |
| JP | 2002-251380 | | 9/2002 |
| JP | 2006-227080 | | 8/2006 |

\* cited by examiner

*Primary Examiner* — Jason Chan
*Assistant Examiner* — Yih-Sien Kao
(74) *Attorney, Agent, or Firm* — Cowan, Liebowitz & Latman ,P.C.

(57) ABSTRACT

An image capturing apparatus performs autofocus control that uses a face detection function. The image capturing apparatus sets a face region as an AF frame if face detection is successful. However, if a state in which face detection is successful transitions to a state in which face detection has failed, and furthermore a variation between subject distances is less than or equal to a threshold value, the image capturing apparatus maintains the previous AF frame setting instead of changing the AF frame setting. If the variation in subject distances is greater than the threshold value, the image capturing apparatus sets the AF frame to a predetermined region that does not follow a face region.

7 Claims, 9 Drawing Sheets

IMAGE CAPTURING APPARATUS AND CONTROL METHOD FOR THE SAME

BACKGROUND OF THE INVENTION

1. Field of the Invention

The present invention relates to an image capturing apparatus and a control method for the same, and in particular to an image capturing apparatus that performs autofocus control and a control method for the same.

2. Description of the Related Art

With autofocus (AF) control in video cameras and the like, a TV-AF system is widely used in which an in-focus position is detected based on the sharpness (contrast) of an image signal generated by using an image sensor. Specifically, for an image signal obtained by sequentially capturing images while moving a focusing lens, AF evaluation values indicating contrast levels are generated, and based on the AF evaluation values, a search is performed to find the focusing lens position at which the contrast is the highest, as the in-focus position.

However, when capturing an image of a person, there are cases in which the focus is put on the background, not the person who is the main subject, due to the relationship of the contrast of the person and the background.

In order to solve such a problem, an image capturing apparatus is known in which a person is detected and a focusing area is set so that the focus is put on the person. For example, there has been proposed an image capturing apparatus that includes a face detection function and performs focusing with respect to a focusing area that includes a detected face region (e.g., see Japanese Patent Laid-Open No. 2006-227080), and an image capturing apparatus that detects a person's eyes and performs focusing based on the eyes (e.g., see Japanese Patent Laid-Open No. 2001-215403).

However, although the focus is put on a detected face in focusing that uses the conventional face detection functions described above, a face cannot always be detected due to various factors. Also, in the exemplary case of performing focusing in which a single detected face region is set as the focusing area, it is possible for the focusing area to constantly change according to the face detection result. Also, if a predetermined focusing area (e.g., at the screen center) is used when a face cannot be detected, there are cases in which faces are detected sometimes and not detected at other times, as a result of which the focusing area changes frequently and focusing stability falls.

Another example of an inability to detect a face includes the case in which the main subject, who is the target of face detection, exists in the angle of view, but the main subject's face temporarily cannot be detected, such as when the main subject is turned to the side or the main subject's eyes are closed, as well as when the main subject is temporarily blocked by another subject.

In this way, when using a configuration in which a fixed focusing area is set when a face cannot be detected regardless of the fact that this is due to a temporary factor, the focusing area is changed to the fixed focusing area if the main subject does not exist in the screen center, as a result of which the captured image is out of focus with respect to the intended subject.

SUMMARY OF THE INVENTION

The present invention has been achieved in view of these problems in conventional technology, and in one viewpoint, the present invention provides an image capturing apparatus that can improve the stability of autofocus control that uses a face detection function and a control method for the same.

According to one aspect of the present invention, there is provided an image capturing apparatus that performs autofocus control by moving a focusing lens, comprising: a ranging unit adapted to measure information corresponding to a subject distance; a detecting unit adapted to detect, in a captured image, a region including a face of a person as a face region; a setting unit adapted to set a focusing area with respect to the captured image; a generating unit adapted to generate an AF evaluation value based on a predetermined frequency range component included in the focusing area of the captured image; and a control unit adapted to perform focusing by moving the focusing lens, based on the AF evaluation value generated by the generating unit, wherein if the face region has been detected, the setting unit sets a focusing area with respect to the face region, and wherein when transitioning from a state in which the face region has been detected to a state in which the face region has not been detected, if a variation between a subject distance measured by the ranging unit in the state in which the face region has been detected and a subject distance in the state in which the face region has not been detected is less than or equal to a predetermined threshold value, the setting unit does not change the focusing area that was set in the state in which the face region has been detected, and if the variation is greater than the predetermined threshold value, the setting unit changes the focusing area to a predetermined area in the captured image.

According to another aspect of the present invention, there is provided an image capturing apparatus that performs autofocus control by moving a focusing lens, comprising: a ranging unit adapted to measure information corresponding to a subject distance; a detecting unit adapted to detect, in a captured image, a region including a face of a person as a face region; a setting unit adapted to set a focusing area with respect to the captured image; a generating unit adapted to generate an AF evaluation value based on a predetermined frequency range component included in the focusing area of the captured image; and a control unit adapted to perform focusing by moving the focusing lens, based on the AF evaluation value generated by the generating unit, wherein if the face region has been detected, the control unit moves the focusing lens based on the AF evaluation value in the focusing area set with respect to the face region, and wherein when transitioning from a state in which the face region has been detected to a state in which the face region has not been detected, if a variation between a subject distance measured by the ranging unit in the state in which the face region has been detected and a subject distance in the state in which the face region has not been detected is less than or equal to a predetermined threshold value, the control unit does not move the focusing lens.

According to still another aspect of the present invention, there is provided a control method for an image capturing apparatus that performs autofocus control by moving a focusing lens, comprising: ranging step of measuring information corresponding to a subject distance; detecting step of detecting, in a captured image, a region including a face of a person as a face region; setting step of setting a focusing area with respect to the captured image; generating step of generating an AF evaluation value based on a predetermined frequency range component included in the focusing area of the captured image; and controlling step of performing focusing by moving the focusing lens, based on the AF evaluation value generated in the generating step, wherein if the face region has been detected, a focusing area is set with respect to the face region in the setting step, and wherein when transitioning from a state in which the face region has been detected to a state in which the face region has not been detected, if a variation between a subject distance measured in the ranging step in the state in which the face region has been detected and a subject distance in the state in which the face region has not been detected is less than or equal to a predetermined threshold value, the focusing area that was set in the state in which the face region has been detected is not changed in the setting step, and if the variation is greater than the predetermined threshold value, the focusing area is changed to a predetermined area in the captured image in the setting step.

According to yet another aspect of the present invention, there is provided a control method for an image capturing apparatus that performs autofocus control by moving a focusing lens, comprising: ranging step of measuring information corresponding to a subject distance; detecting step of detecting, in a captured image, a region including a face of a person as a face region; setting step of setting a focusing area with respect to the captured image; generating step of generating an AF evaluation value based on a predetermined frequency range component included in the focusing area of the captured image; and controlling step of performing focusing by moving the focusing lens, based on the AF evaluation value generated in the generating step, wherein if the face region has been detected, the focusing lens is moved in the controlling step based on the AF evaluation value in the focusing area set with respect to the face region, and wherein when transitioning from a state in which the face region has been detected to a state in which the face region has not been detected, if a variation between a subject distance measured in the ranging step in the state in which the face region has been detected and a subject distance in the state in which the face region has not been detected is less than or equal to a predetermined threshold value, the focusing lens is not moved in the controlling step.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

Embodiment 1

Figure 1:
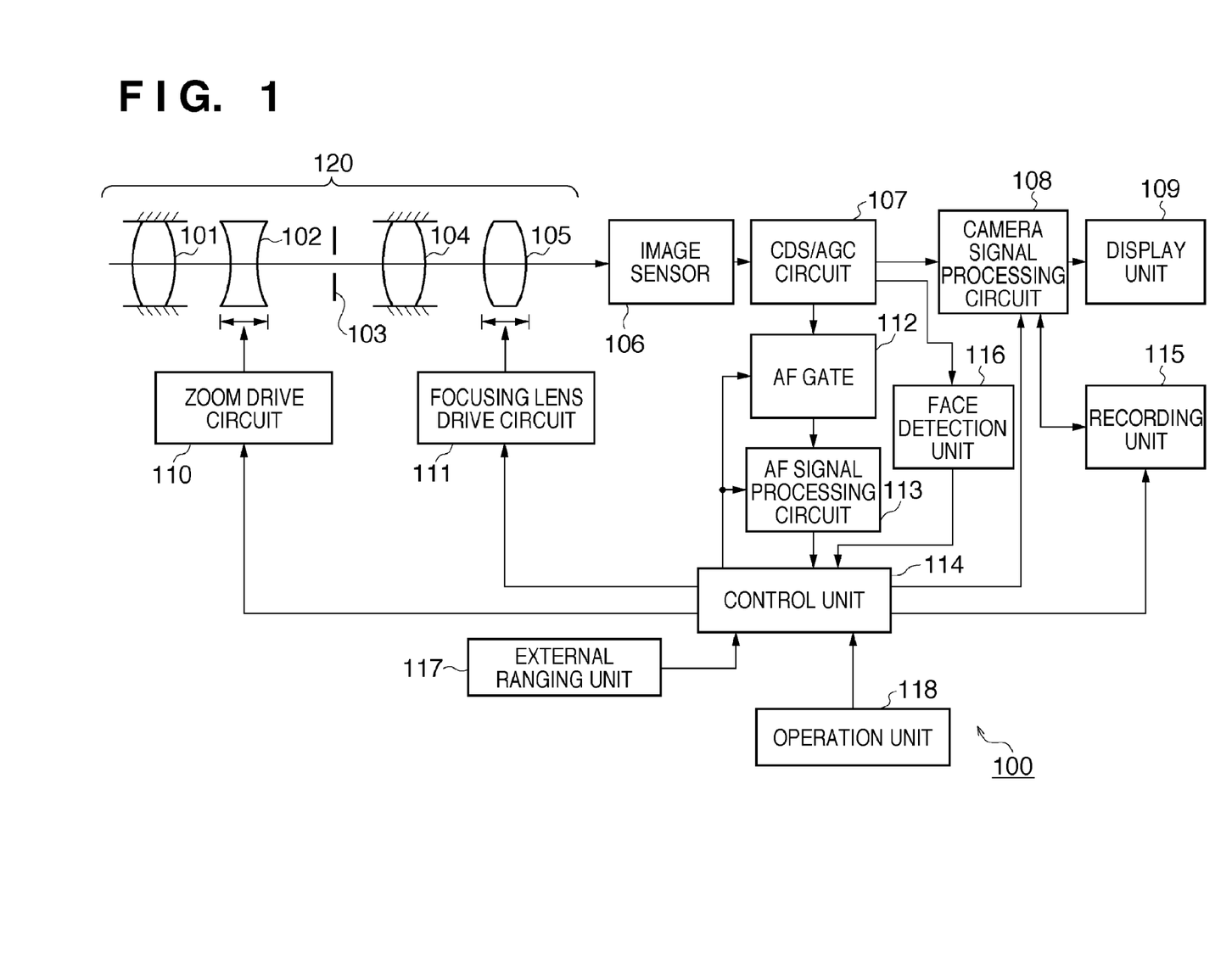
FIG. 1 is a block diagram showing an exemplary configuration of a digital video camera, which is one example of an image capturing apparatus according to Embodiment 1 of the present invention.

FIG. 1 is a block diagram showing an exemplary configuration of a digital video camera 100, which is one example of an image capturing apparatus according to Embodiment 1 of the present invention. It should be noted that the present invention can also be applied to other arbitrary image capturing apparatuses that have a face detection function and a video capturing function, such as a digital still camera, as well as devices including such an image capturing apparatus.

In FIG. 1, the digital video camera 100 of the present embodiment includes a zoom lens 120 that has an autofocus function, as an image capturing optical system. The zoom lens 120 includes a first fixed lens 101, a variable power lens 102 that performs magnification and reduction by moving in the optical axis direction, an aperture 103, a second fixed lens 104, and a focus compensator lens 105. The focus compensator lens (hereinafter, simply called a focusing lens) 105 includes both a function for correcting movement of the focal plane that accompanies magnification/reduction and a focusing function.

An image sensor 106 is configured from a photoelectric conversion element such as a CCD sensor or CMOS sensor. A CDS/AGC circuit 107 performs correlated double sampling on output from the image sensor 106, as well as performs automatic gain control.

A camera signal processing circuit 108 performs various types of image processing on an output signal from the CDS/AGC circuit 107 and generates a video signal. A display unit 109 is configured from an LCD or the like and displays the video signal from the camera signal processing circuit 108. A recording unit 115 records the video signal from the camera signal processing circuit 108 to a recording medium (magnetic tape, optical disk, semiconductor memory, or the like).

A zoom drive circuit 110 moves the variable power lens 102 under control of a control unit 114. A focusing lens drive circuit 111 moves the focusing lens 105 under control of the control unit 114. The zoom drive circuit 110 and the focusing lens drive circuit 111 are each configured from an actuator such as a stepping motor, a DC motor, a vibrating motor, or a voice coil motor.

Among output signals for all pixels from the CDS/AGC circuit 107, an AF gate 112 supplies, to an AF signal processing circuit 113 that is downstream, only signals pertaining to an area (focusing area or AF frame) used in focusing as set by the control unit 114.

The AF signal processing circuit 113 extracts a predetermined frequency band component, specifically the high frequency component, from pixel signals in the focusing area that have been supplied from the AF gate 112, by applying a filter for example, and generates an AF evaluation value.

The AF evaluation value is output to the control unit 114. An AF evaluation value is a value representing the sharpness (amount of contrast) of an image generated based on output signals from the image sensor 106, and since the sharpness is high in an in-focus image and low in an out-of-focus image, an AF evaluation value can be used as a value that represents the focusing state of the image capturing optical system.

The control unit 114 is a microcomputer or the like and controls units in the digital video camera 100 by executing a control program stored in a ROM (not shown) in advance, thus controlling the overall operation of the digital video camera 100. The control unit 114 performs an AF control (autofocus control) operation by controlling the focusing lens drive circuit 111 based on AF evaluation values received from the AF signal processing circuit 113. The control unit 114 also changes the magnifying power of the zoom lens 120 by controlling the zoom drive circuit 110 in accordance with a zoom instruction from an operation unit 118 that is described later.

A face detection unit 116 applies face detection processing based on heretofore known face detection technology to image signals output from the CDS/AGC circuit 107, and detects a face region, which is an example of a person region in an image. Examples of heretofore known face detection technology include a learning-based technique that uses a neural network or the like, and a technique that uses template matching to search an image for sites that have characteristic shapes, such as the eyes, nose, and mouth, and considers a region to be a face region if the degree of similarity is high. Numerous other techniques have been proposed, such as detecting image feature amounts such as skin color and eye shape, and using statistical analysis. A combination of such techniques is generally used in order to improve the precision of face detection. A specific example is a method of detecting a face by using wavelet conversion and image feature amounts, which is disclosed in Japanese Patent Laid-Open No. 2002-251380.

The face detection unit 116 outputs, to the control unit 114 as a face detection result, information that enables specifying within an image, for example, the position and size of a region (face region) detected to be a person's face. The information that enables specifying the position of the face region may indicate the center position of the face region or the positions of face feature points such as the eyes, nose, and mouth. Based on the result of the face detection, the control unit 114 instructs the AF gate 112 to set the focusing area to an area including the face region in the image.

An external ranging unit 117 measures information regarding a subject distance (detects a defocus amount and direction thereof) without using light that has passed through the zoom lens 120. The external ranging unit 117 may determine the subject distance from the measured defocus amount and direction thereof, and output the subject distance as the measurement result.

The external ranging unit 117 can employ an arbitrary method such as an external phase-difference detection method, an ultrasonic sensor method, or an infrared sensor method, and in the present embodiment, the external phase-difference detection method is used. Range information (subject distance, or defocus amount and direction thereof) and range reliability information are supplied from the external ranging unit 117 to the control unit 114, and are converted to a focusing lens position. Range reliability information can be set according to the ranging method used by the external ranging unit 117. For example, when using an external phase-different detection method that performs ranging by using the phase difference of a set of signal waveforms obtained by halving a light beam from the subject and causing the halved light beam to be received by a set of line sensors, the correlativity of the set of signal waveforms can be used as the range reliability information.

The operation unit 118 is an input device group including a switch, a button, a dial, and the like by which an image capturer inputs various types of instructions and settings to the digital video camera 100. The operation unit 118 includes, for example, an image capturing start/pause button, a zoom switch, a still image capturing button, a directional button, a menu button, and an execute button.

Figure 2A:
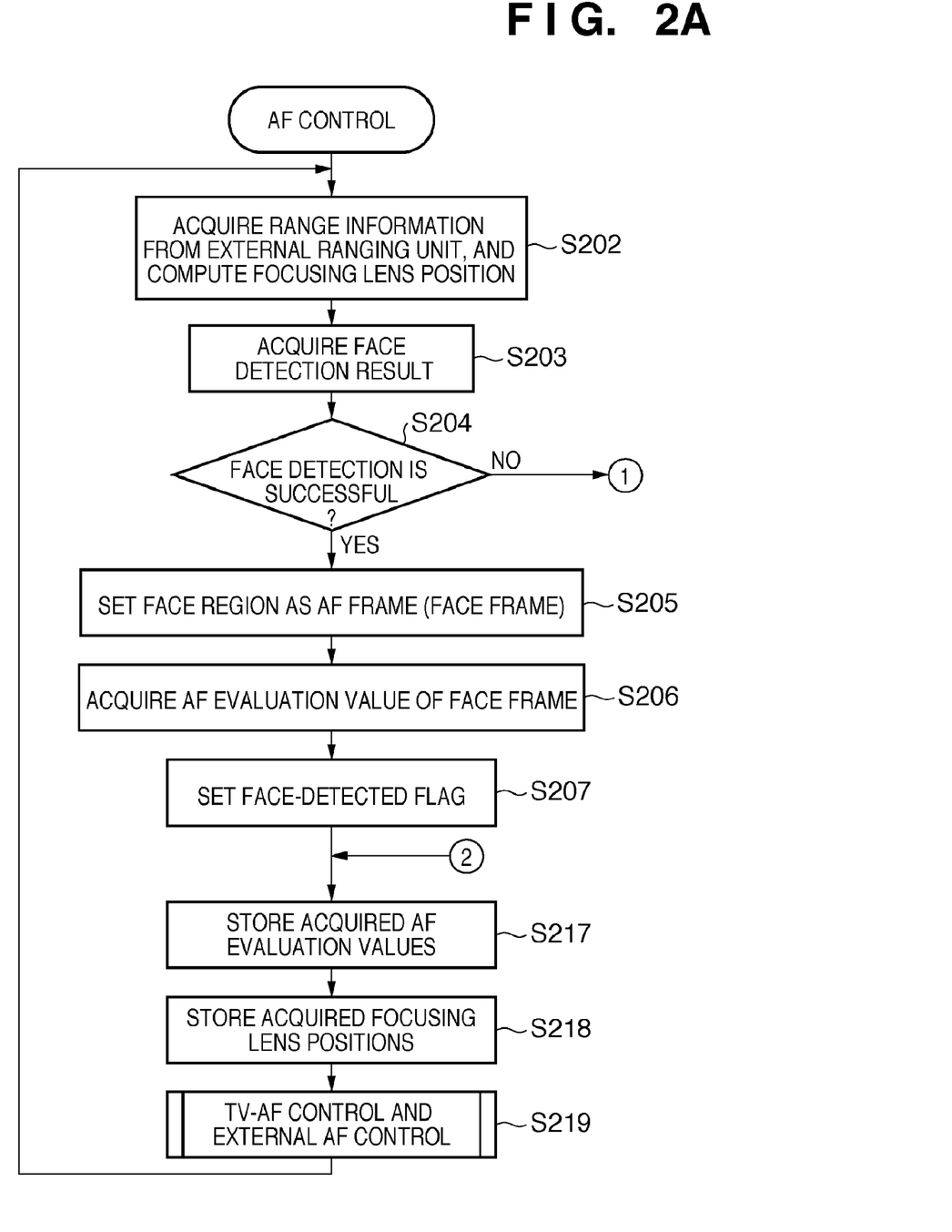
FIGS. 2A and 2B are flowcharts illustrating AF control operations in the digital video camera according to Embodiment 1 of the present invention.
Figure 2B:
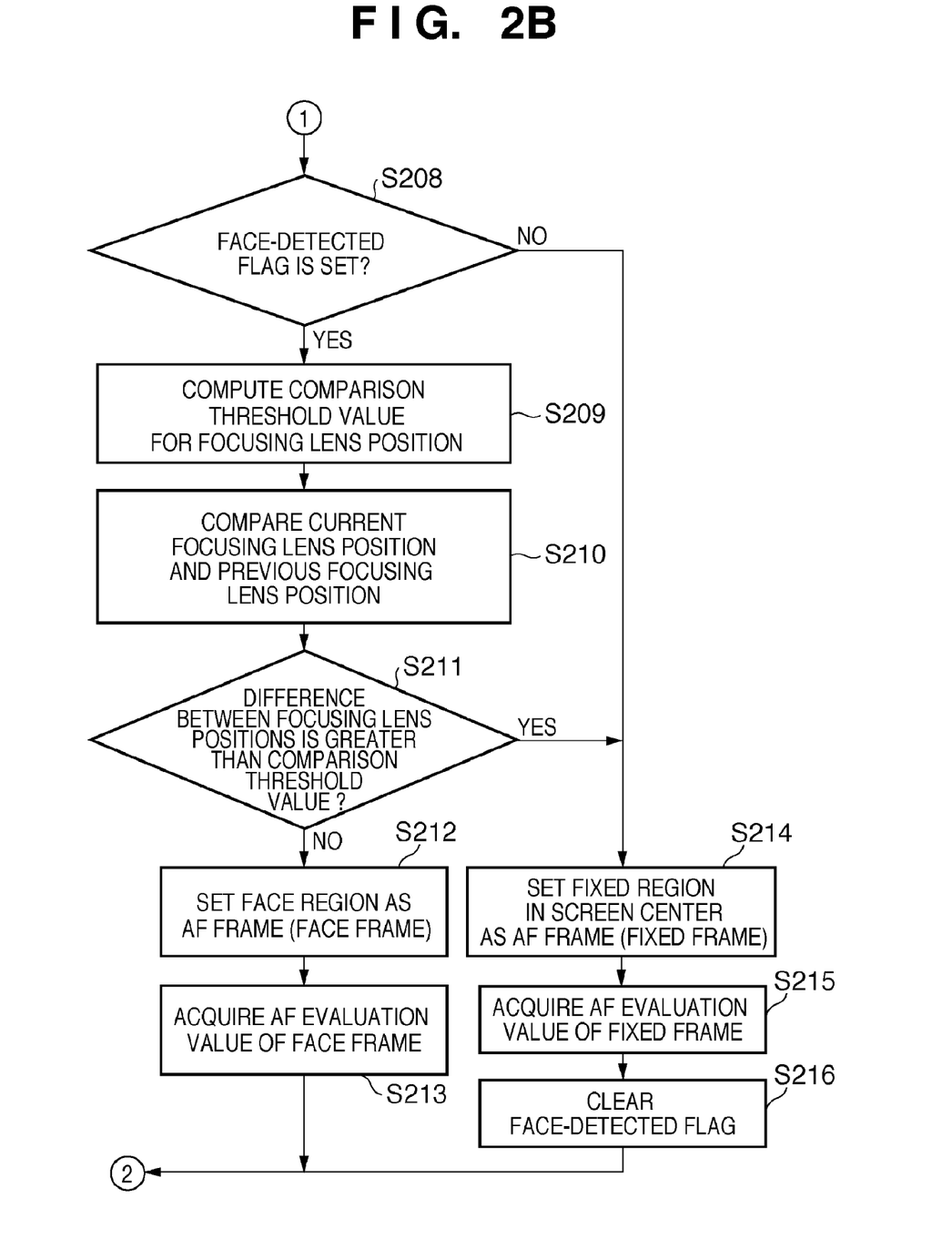

The following describes details of the AF control performed by the control unit 114 with reference to the flowcharts shown in FIGS. 2A and 2B. The AF control operation shown in FIGS. 2A and 2B are repeatedly executed at the read cycle of image signals from the image sensor 106 for generating, for example, an image corresponding to one field.

It should be noted that in order for the display unit 109 to function as an electronic viewfinder (EVF), image capture and display are repeated at a predetermined frame rate (e.g., 30 frames per second). In this case, in order to lessen the processing load, an image (display image) having fewer pixels than the image sensor 106 is generally generated for display on the display unit 109. Although a display image is generated in the present embodiment as well, and the face detection unit 116 performs face detection on the display image, a configuration in which face detection is performed on an image having more pixels than the display image is also possible. It should be noted that the face detection unit 116 may execute face detection on each frame in the display image, or once every predetermined number of frames.

In S202, the control unit 114 acquires range information from the external ranging unit 117, and computes a target position of the focusing lens 105 from the subject distance or the defocus amount and direction thereof.

In S203, the control unit 114 acquires a face detection result from the face detection unit 116 and determines whether a face has been detected. In S204, the control unit 114 determines that the face detection is successful if a face has been detected, and proceeds to the processing of S205. The control unit 114 determines that the face detection has failed if a face has not been detected, and proceeds to the processing of S208.

Upon determining that the face detection is successful, in S205 the control unit 114 sets a detected face region as a focusing area (AF frame) in the AF gate 112, based on the face detection result acquired from the face detection unit 116. The AF frame set with respect to the face region is hereinafter simply called the face frame. The face frame follows the corresponding face region. Also, the face frame does not need to be the same size as the face region, but rather the face frame can be set as, for example, a rectangular area that circumscribes the face region, or a rectangular area included in such a rectangular area.

Next, in S206 the control unit 114 acquires an AF evaluation value for the face frame. Then in S207, the control unit 114 sets a flag indicating that face detection was successful (hereinafter, simply called the face-detected flag). The face-detected flag is, for example, 1-bit data held by the control unit 114, where a value of 1 indicates a set state, and a value of 0 indicates a reset (not set) state.

In S217, the control unit 114 stores the AF evaluation value that was acquired from the set AF frame in S206, S213, or S215. Not only the newest AF evaluation value is stored, but also a predetermined number of past AF evaluation values are stored as a history.

In S218, the control unit 114 stores the focusing lens position computed in S202. Not only the newest focusing lens position is stored, but also a predetermined number of past focusing lens positions are stored as a history.

Then in S219, the control unit 114 performs focusing, which is a combination of TV-AF control using the AF evaluation value stored in S217 and AF control (external AF control) that uses the focusing lens position stored in S218 and is based on the range information from the external ranging unit 117.

In the TV-AF control referred to here, as described above, AF evaluation values indicating the contrast level are determined while changing the position of the focusing lens 105, and a search is performed to find the position of the focusing lens 105 at which the AF evaluation value is the highest, as the in-focus position.

TV-AF control also includes processing for maintaining an in-focus state, such as processing for determining a change in the AF evaluation value, which is used in a determination as to whether it is necessary to drive the focusing lens 105 again while in an in-focus state.

On the other hand, in the external AF control, the focusing lens 105 is moved to the focusing lens position computed in S202.

In the present invention, there are no particular limitations on how TV-AF control and external AF control are combined to perform focusing. For example, when close to the in-focus state, highly precise and stable focusing is performed using TV-AF control. When far from the in-focus state and the subject is largely out of focus, it is possible to, for example, first use external AF control to quickly move the focusing lens 105 to the vicinity of the in-focus position, and thereafter switch to TV-AF control. This is merely one example, and both types of control can be combined in an arbitrary heretofore known method.

On the other hand, upon determining in S204 that face detection has failed, in S208 the control unit 114 determines whether the face-detected flag has been set.

If the main subject (i.e., the person's face in the present embodiment) has not been recognized, setting the main subject as the AF frame is difficult. If the face-detected flag has not been set, the control unit 114 determines that there is a high probability that the subject, who is a person, does not exist in the currently captured scene. In this case, in S214 the control unit 114 sets, in the AF gate 112, a focusing area whose center is fixed at the screen center (hereinafter, called a fixed frame), in consideration of the fact that the image capturer normally puts the subject to be captured in the center of the screen.

Next, the control unit 114 acquires an AF evaluation value from the fixed frame in S215, clears the face-detected flag in S216, and from S217 onward, performs the processing described above. In other words, if a face has not been detected, and furthermore the face-detected flag has been cleared, in S219 TV-AF control is executed with respect to a fixed frame.

Upon determining in S208 that the face-detected flag has been set, in S209 the control unit 114 computes a comparison threshold value to be used in a comparison with a difference between the value of the current focusing lens position and the value of the previous focusing lens position that was computed in S202 and is based on the ranging result from the external ranging unit 117.

Then, in S210 the control unit 114 compares the comparison threshold value computed in S209 and the difference (variation) between the value of the current focusing lens position and the value of the previous focusing lens position that was stored in S218 and is based on the ranging result from the external ranging unit 117.

Then, in S211 the control unit 114 determines whether the variation between focusing lens positions is greater than the comparison threshold value computed in S209. If the difference is greater than the threshold value, the control unit 114 determines that the main subject no longer exists in the scene being captured. In this case, the control unit 114 moves to the processing of S214, and similarly to the case in which the face-detected flag has not been set, sets the fixed frame as the focusing area.

On the other hand, if the variation between focusing lens positions that is based on the ranging result from the external ranging unit 117 is less than or equal to the comparison threshold value computed in S209, the control unit 114 determines that the main subject exists in the captured scene, but temporarily cannot be detected. Examples of such a state include the case in which the main subject's face cannot be recognized due to the fact that the main subject has turned to the side or closed his or her eyes, or the fact that another subject has moved in front of the main subject.

In this case, the control unit 114 does not change the focusing area setting. In other words, TV-AF control is performed using the currently set face frame. Similarly to S205, in S212 the control unit 114 sets the AF frame to the face frame at the same position as the previous position. Then, similarly to S206, in S213 the control unit 114 acquires the AF evaluation value of the face frame. Thereafter, the control unit 114 performs the processing of S217 onward, in which focusing is performed by a combination of TV-AF control and external AF control as described above.

In this way, if the face-detected flag has been set, the control unit 114 determines whether the main subject (human subject) still exists or no longer exists in the captured scene based on the difference between focusing lens positions that is based on the ranging result of the external ranging unit 117. This is because if, for example, face detection fails at the current point in time but was previously successful, there is a high probability of the main subject still existing in the captured scene if there has not been a large change in the in-focus position, thereby enabling determining that a face temporarily cannot be detected. On the other hand, if the main subject has moved out of the captured scene, there will be a large change in the focusing lens position computed based on the range information from the external ranging unit 117.

Consequently, the comparison threshold value computed in S209 may be a fixed value that has been empirically determined as a value suited for determining whether the main subject still exists. Alternatively, the comparison threshold value may be changed according to the focal distance (angle of view) of the zoom lens 120. This is because when the wide-angle side in which the focal distance is short and telephoto side in which the focal distance is long are compared, the more the focal distance is on the telephoto side, the greater the probability of an increase in the influence of camera shake and a rise in the variation between focusing lens positions. Accordingly, a larger comparison threshold value may be computed as the focal distance increases.

In place of the focusing lens positions, information indicating the distance to the main subject (e.g., subject distance, or defocus amount and direction thereof) can be used in the processing of S209, S210, and S211.

In the case of the external ranging unit 117 using the external phase-difference detection method and comparing subject distances in place of focusing lens positions, a larger comparison threshold value can be computed when the subject distance is large (close to infinity). This is because in the phase-difference detection method, the variation in subject distances becomes large when the subject distance is close to infinity.

As described above, according to the present embodiment, if a person's face has been detected, a face region is set as the AF frame, thereby enabling stably focusing on the person.

Furthermore, even if a state of successful face detection transitions to a state of failed face detection, the AF frame continues to be set to the face region if a variation in information regarding subject distances obtained using an external ranging unit is less than or equal to a predetermined value. For this reason, the stability of autofocus control is improved over conventional technology in which the focusing area is switched even if face detection temporarily fails due to the fact that, for example, a human subject has turned to the side.

Embodiment 2

The following describes Embodiment 2 of the present invention.

With the exception of the AF control operation, it is sufficient for an image capturing apparatus according to the present embodiment to be the same as the image capturing apparatus according to Embodiment 1. The following therefore describes only the AF control operation.

Figure 3A:
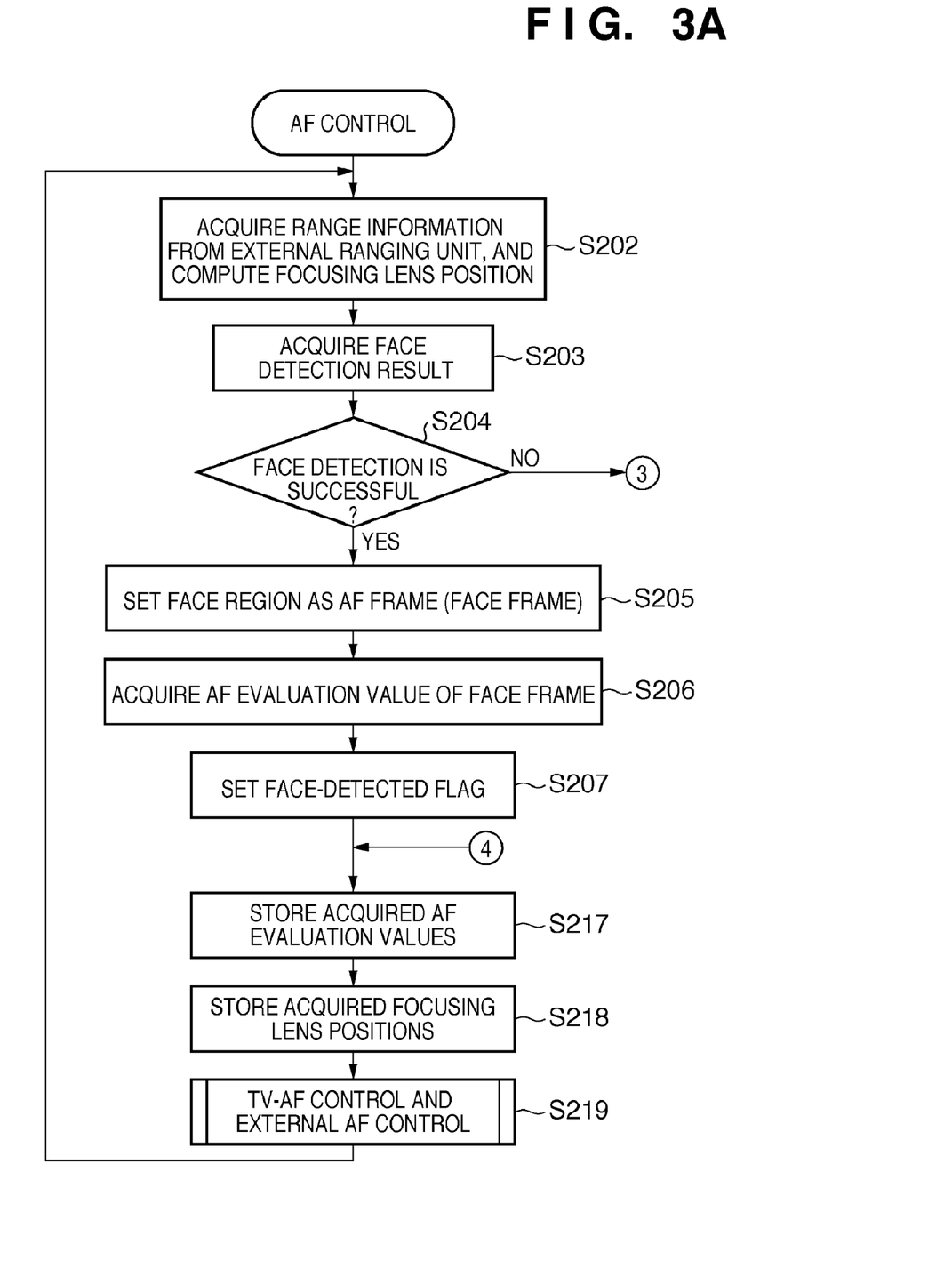
FIGS. 3A and 3B are flowcharts illustrating AF control operations in a digital video camera according to Embodiment 2 of the present invention.
Figure 3B:
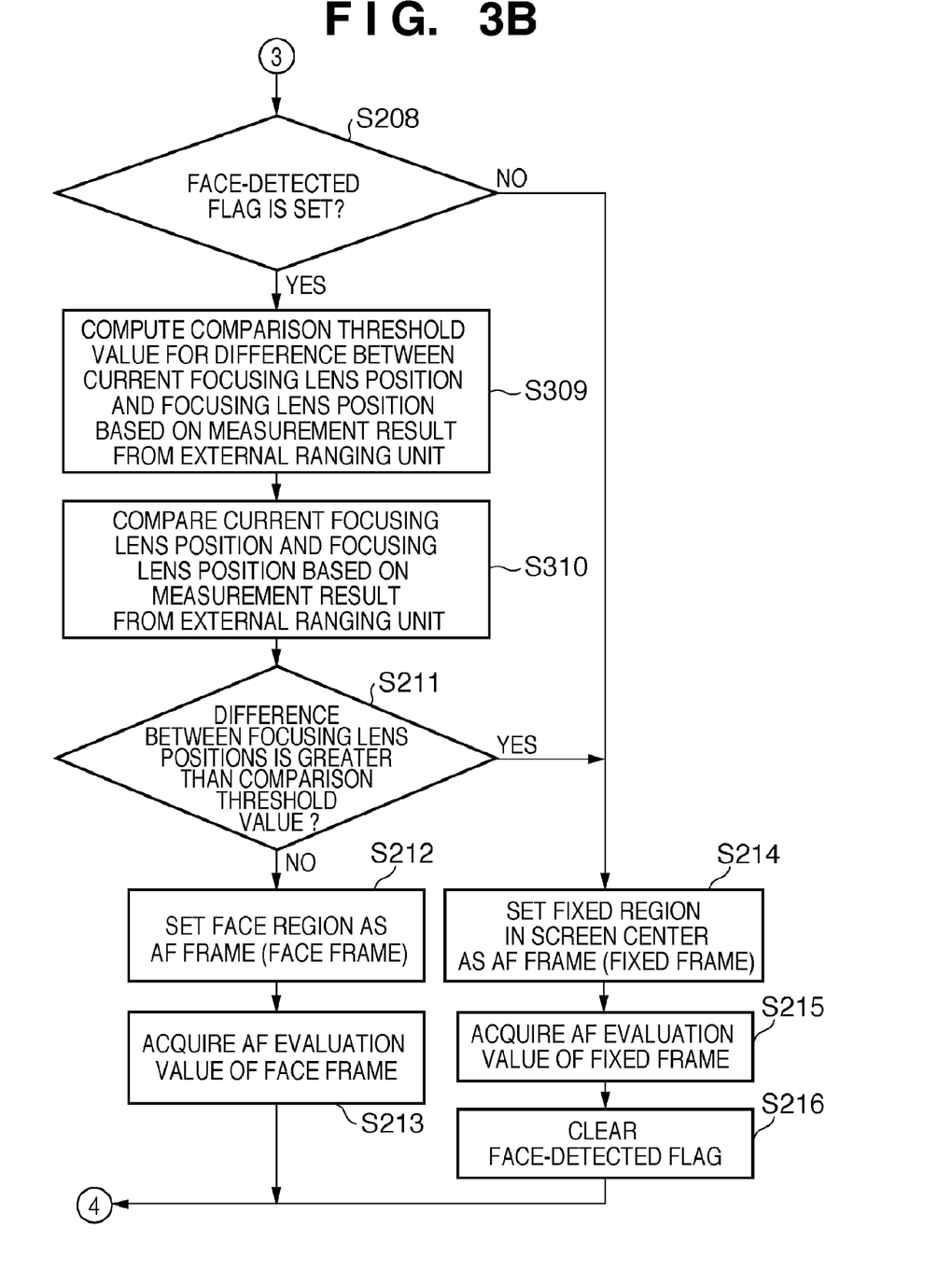

FIGS. 3A and 3B are flowcharts illustrating AF control operations in the image capturing apparatus of the present embodiment. In FIGS. 3A and 3B, steps for performing the same operations as described in Embodiment 1 have been given the same reference numbers, and descriptions thereof have been omitted.

As shown in FIGS. 3A and 3B, the AF control operation of the present embodiment differs from the AF control operation of Embodiment 1 (FIGS. 2A and 2B) with respect to a method in which, if a state in which face detection was successful transitions to a state in which face detected has failed (S208: YES), a determination is performed as to whether the failure in face detection is temporary. Alternatively, it can be said that the difference is with respect to a method in which, if the state in which face detection was successful transitions to the state in which face detected has failed, a determination is performed as to whether there is a high probability that the main subject still exists in the captured scene.

Specifically, a determination is performed as to whether there is a high probability that the main subject still exists in the captured scene, based on whether a difference between the current focusing lens position and a focusing lens position based on current range information from the external ranging unit 117 is greater than a comparison threshold value.

In other words, upon determining in S208 that the face-detected flag has been set, the control unit 114 proceeds to the processing of S309.

In S309, the control unit 114 computes a comparison threshold value to be used in a comparison with a difference between the current focusing lens position and the focusing lens position computed in S202 based on the range information from the external ranging unit 117. The current focusing lens position is the focusing lens position obtained as a result of the control performed in S219.

Then, in S310, the control unit 114 performs a comparison to obtain a difference between the current focusing lens position and the focusing lens position computed in S202 based on the range information from the external ranging unit 117.

In S211, the control unit 114 determines whether the difference between the current focusing lens position and the focusing lens position computed in S202 is greater than the comparison threshold value computed in S309. If the difference is greater than the threshold value, the control unit 114 determines that the main subject no longer exists. The control unit 114 then proceeds to the processing of S214 and sets a fixed frame as the focusing area.

On the other hand, if the difference between the current focusing lens position and the focusing lens position computed in S202 is less than or equal to the comparison threshold value computed in S309, the control unit 114 determines that face detection has temporarily failed, and instead of changing the focusing area, sets the face frame in the same way as the previous setting. Examples of such a state include the case in which the main subject's face cannot be recognized due to the fact that the main subject has turned to the side or closed his or her eyes, or the fact that another subject has moved in front of the main subject.

It should be noted that in the present embodiment, the comparison performed to obtain the difference between the current focusing lens position and the focusing lens position computed in S202 based on the range information from the external range unit 117 is performed due to the fact that there are cases in which the ranging precision of the external ranging unit 117 is low.

If the ranging precision of the external ranging unit 117 is low, the subject distance and focusing lens position cannot always be acquired. For this reason, there are cases in which the main subject, whose face was detected, is not in focus at the focusing lens position previously computed based on the range information from the external ranging unit 117.

There are also cases in which the external ranging unit 117 cannot successfully perform ranging while the face detection is successful, but can successfully perform ranging after the face detection is no longer successful. In such a case, there is a drop in the precision of the determination performed in Embodiment 1, which is based on the difference between focusing lens positions that were computed based on range information from the external ranging unit 117.

For this reason, in the present embodiment, if a state in which face detection was successful transitions to a state in which face detected has failed, the current focusing lens position and the newest focusing lens position based on range information from the external ranging unit 117 are compared. As a result, even if the ranging precision of the external ranging unit 117 is low, it is easy to determine whether the main subject exists or does not exist, and if the main subject no longer exists, it is possible to quickly perform focusing with respect to a new main subject.

Embodiment 3

The following describes Embodiment 3 of the present invention.

With the exception of the AF control operation, it is sufficient for an image capturing apparatus according to the present embodiment to be the same as the image capturing apparatus according to Embodiment 1. The following therefore describes only the AF control operation.

Figure 4A:
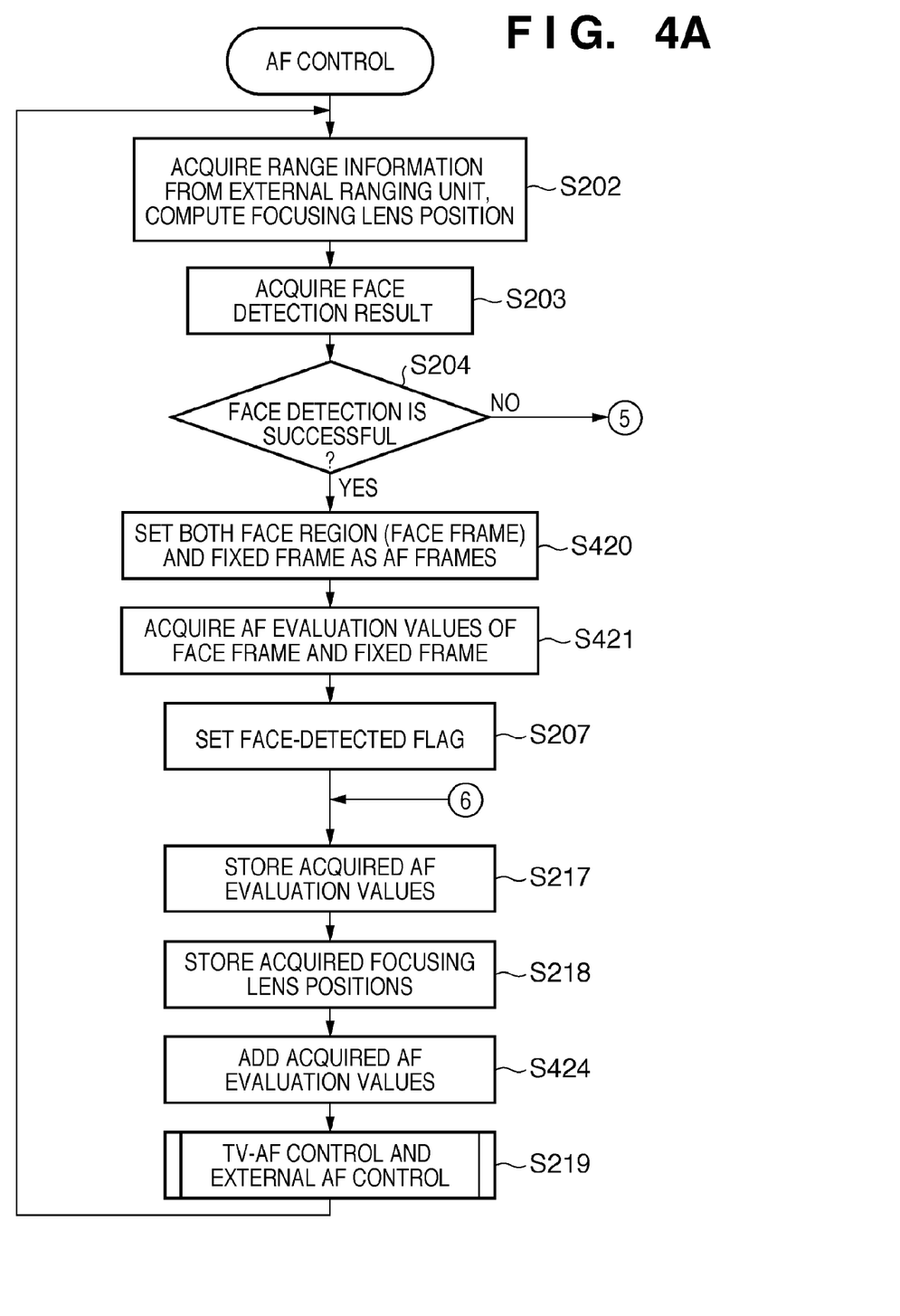
FIGS. 4A and 4B are flowcharts illustrating AF control operations in a digital video camera according to Embodiment 3 of the present invention.
Figure 4B:
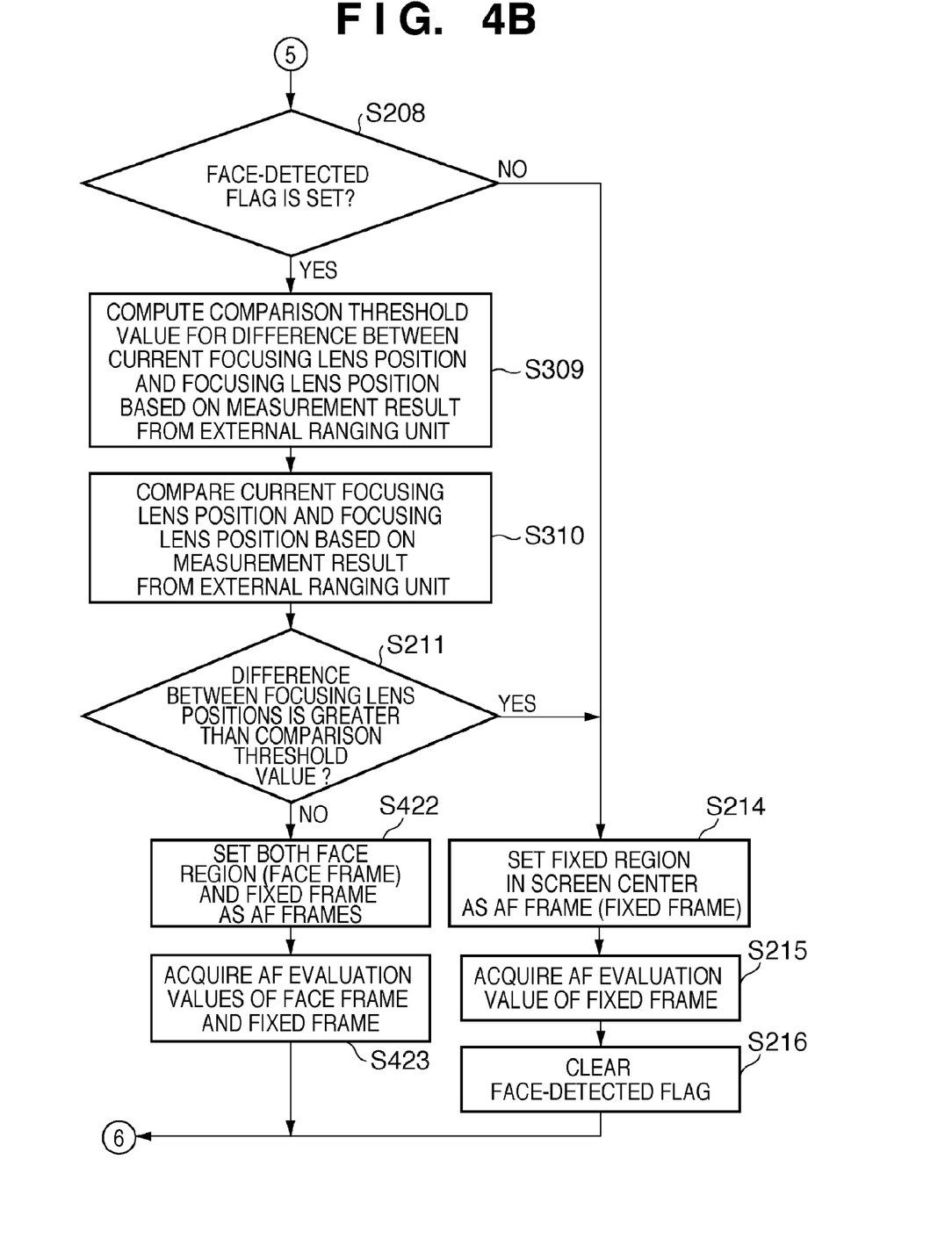

FIGS. 4A and 4B are flowcharts illustrating AF control operations in the image capturing apparatus of the present embodiment. In FIGS. 4A and 4B, steps for performing the same operations as described in Embodiments 1 and 2 have been given the same reference numbers, and descriptions thereof have been omitted.

As shown in FIGS. 4A and 4B, a characteristic feature of the AF control operation in the present embodiment is that if a face has been detected, both a face frame and a fixed frame are set in the AF gate 112 as focusing areas.

Specifically, if the control unit 114 has determined that face detection is successful in S204, in S420 the control unit 114 sets both the face frame and the fixed from in the AF gate 112 as focusing areas.

As described above, the face frame is a focusing area set with respect to a face region detected by the face detection unit 116, and the position of the face frame follows any changes in the detected position of the corresponding face region. On the other hand, the fixed frame is fixed at a center position (in the present embodiment, at the screen center) regardless of the subject. It should be noted that in the present embodiment, the fixed frame is set so as to be larger than the face frame and also include the face frame. Also, two or more fixed frames may be set. In this case, the size of at least one of the fixed frames is set so as to include the face frame.

In S421, the control unit 114 acquires an AF evaluation value from the face frame and from the fixed frame via the AF signal processing circuit 113. In S207, the control unit 114 sets the face-detected flag.

In S217, the control unit 114 stores the AF evaluation values that were acquired from the set AF frames. Not only the newest AF evaluation value is stored, but also a predetermined number of past AF evaluation values are stored as a history.

In S218, the control unit 114 stores the focusing lens position (focusing lens position based on range information from the external ranging unit 117) computed in S202. Not only the newest focusing lens position is stored, but also a predetermined number of past focusing lens positions are stored as a history.

Then, in S424 the control unit 114 adds together the AF evaluation values acquired from the set AF frames, and generates an AF evaluation value that is to be mainly used in the case of performing focus control by TV-AF control.

Here, in consideration of the fact that there is a high probability that the subject intended to be imaged by the image capturer is a person, when an AF evaluation value is obtained from both the face frame and the fixed frame, the AF evaluation value obtained from the face frame may be weighted more than the AF evaluation value obtained from the fixed frame when performing addition. The weight that is given may also be changed according to the position in the image where the face region set as the face frame exists. For example, in consideration of the fact that the main subject is often put in the screen center, a greater weight can be given when the face region is in the vicinity of the screen center, and a lesser weight can be given when the face region is at the edge of the screen.

Particularly when capturing video, it is supposed that subjects other than the main subject often enter the capturing range during capture. In such a case, if the weight of the AF evaluation value of the face frame is fixed, the focus may move to the face of a person who is at the edge of the screen and who is not intended to be imaged, and there is a probability of focusing becoming temporarily unstable.

In S219, the control unit 114 executes AF control, which is a combination of TV-AF control and external AF control.

On the other hand, if face recognition fails, the control unit 114 proceeds to S208 and determines whether the face-detected flag has been set. If the face-detected flag has not been set, the control unit 114 executes the processing of S214 to S216 in the same way as in Embodiment 1. Accordingly, only an AF evaluation value from the fixed frame is obtained.

Upon determining in S208 that the face-detected flag has been set, the control unit 114 performs the processing of S309, S310, and S211 that are described in Embodiments 1 and 2.

In S211, if the difference between the current focusing lens position and the focusing lens position computed in S202 is greater than the comparison threshold value computed in S309, the control unit 114 determines that the main subject no longer exists. The control unit 114 then proceeds to the processing of S214 and sets the fixed frame as the focusing area.

On the other hand, if the difference between the current focusing lens position and the focusing lens position computed in S202 is less than or equal to the comparison threshold value computed in S309, the control unit 114 determines that face detection has temporarily failed.

Then similarly to S420, in S422 the control unit 114 sets the face frame and the fixed frame to the same positions as were previously set, and similarly to S421, in S423 the control unit 114 acquires an AF evaluation value from the face frame and from the fixed frame.

Figure 5A:
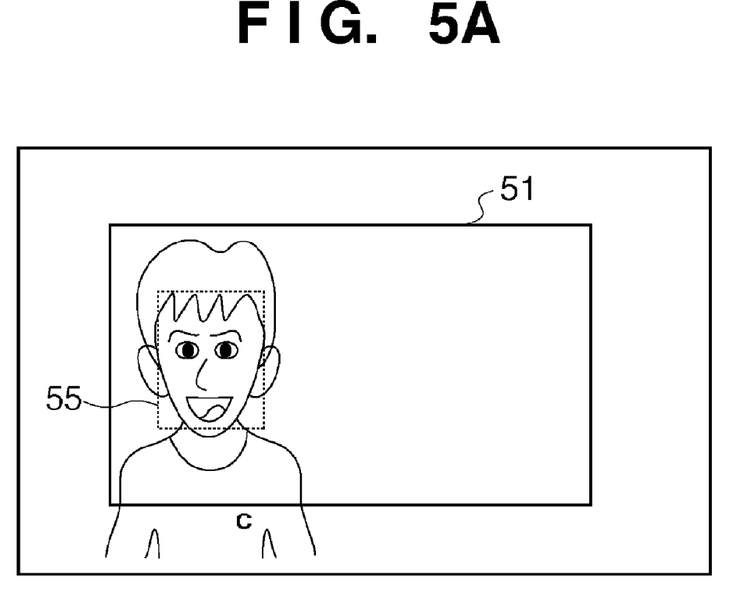
FIGS. 5A and 5B are diagrams showing exemplary AF frame settings in the digital video camera according to Embodiment 3 of the present invention.
Figure 5B:
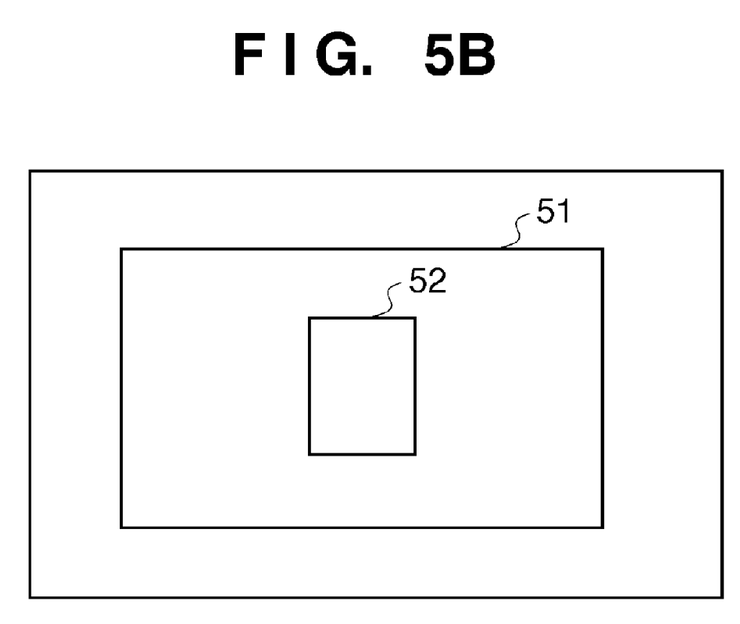

The following describes an example of AF frame setting in the present embodiment with reference to FIGS. 5A and 5B.

FIG. 5A shows an exemplary case of setting both a face frame and fixed frame, and FIG. 5B shows an exemplary case of setting only a fixed frame.

As shown in FIG. 5A, a fixed frame 51 is set at the screen center and so as to be larger than a face frame 55 and to include the face frame 55. The fixed frame 51 is set so as to occupy a wide range of the screen in order obtain an AF evaluation value without specifying a subject.

On the other hand, in the case of setting the fixed frame and not setting the face frame, the fixed frame 51 can be set in the same way as in FIG. 5A. However, in consideration of the fact that the image capturer often puts the intended subject in the screen center when performing image capture, a fixed frame 52 that is smaller than the fixed frame 51 may be set as shown in FIG. 5B. The fixed frame 52 is similar to the fixed frame 51 in that the frame center is at the screen center. Instead of setting only the fixed frame 52, both the fixed frame 51 and the fixed frame 52 can be set.

As described above, according to the present embodiment, if a face is detected, or in the case of determining that a face temporarily cannot be detected, the AF frame is set to both a face frame and a fixed frame, and focus control is performed based on AF evaluation values obtained from both frames. For this reason, in addition to the same effects as in Embodiment 2, it is possible to suppress the probability of focusing on an unintended person, by performing focus control that takes into account information other than information pertaining to a face region.

Embodiment 4

The following describes Embodiment 4 of the present invention.

Figure 6:
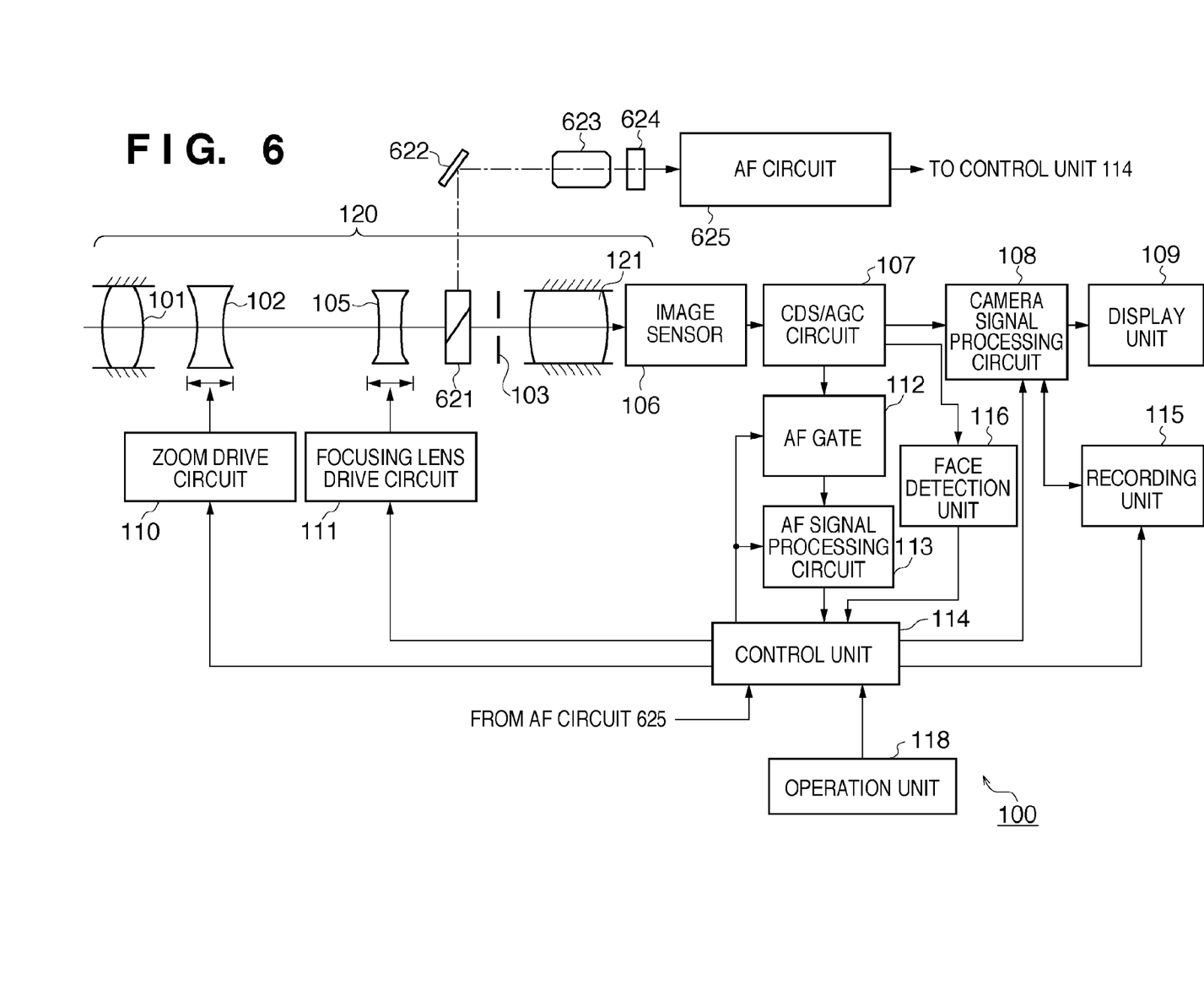
FIG. 6 is a block diagram showing an exemplary configuration of a digital video camera, which is one example of an image capturing apparatus according to Embodiment 4 of the present invention.

FIG. 6 is a block diagram showing an exemplary configuration of a digital video camera 100', which is one example of an image capturing apparatus according to Embodiment 4 of the present invention. In FIG. 6, constituent elements that are the same as in the digital video camera 100 of Embodiment 1 have been given the same reference numerals as in FIG. 1, and redundant descriptions have been omitted.

The image capturing apparatus according to the present embodiment differs from the digital video camera 100 of Embodiment 1 with respect to having a configuration for performing ranging by a TTL method (internal ranging), in place of the external ranging unit 117.

For this reason, in the order from the subject side, the zoom lens 120 of the digital video camera 100' of the present embodiment is configured from the first fixed lens 101, the variable power lens 102, the focusing lens 105, a half prism 621, the aperture 103, and the second fixed lens 121.

The half prism 621 splits a light beam traveling from the focusing lens 105 toward the aperture 103 into a light beam component bound for the image sensor 106 and a light beam component bound for an AF sensor 624 that is described later. Since the aperture 103 is constantly operating during video capture, incident light beams are split by the half prism 621, which is disposed between the aperture 103 and the subject.

A sub mirror 622 changes the direction of the optical path by reflecting the light beam component that was split by the half prism 621. An imaging lens 623 causes the light beam reflected by the sub mirror 622 to form an image on the AF sensor 624. In the present embodiment, the AF sensor 624 has a pair of light receiving element lines (line sensors) for phase-difference detection method AF. An AF circuit 625 calculates, as range information, a subject distance or a defocus amount and direction thereof based on the phase difference of a pair of image signals output from the pair of line sensors of the AF sensor 624.

The sub mirror 622, imaging lens 623, AF sensor 624, and AF circuit 625 form a ranging unit that uses an internal phase-difference detection method (internal ranging unit).

With a video camera having this configuration, an AF control operation that is similar to the AF control operation described in Embodiments 1 to 3 (FIGS. 2 to 4) can be performed by obtaining range information from the AF circuit 625, in place of the external ranging unit 117. Here, it is sufficient for the range information to be a defocus amount and direction thereof.

For example, in S202 the control unit 114 computes the in-focus position (internal in-focus position) of the focusing lens 105 based on range information from the AF circuit 625.

Also, in S210 the control unit 114 computes a variation between the previous and current focusing lens positions or subject distances, which are based on range information from the AF circuit 625, and compares the variation to a comparison threshold value.

Also, in S219 the control unit 114 executes AF control, which is a combination of TV-AF control and AF control that is based on range information from the internal ranging unit (internal AF control).

Alternatively, in S310 the control unit 114 determines whether a difference between the current focusing lens position and the focusing lens position that is based on the range information from the AF circuit 625 is greater than the comparison threshold value.

In this way, the present embodiment also enables achieving the same effects as in Embodiments 1 to 3.

Other Embodiments

It should be noted that the embodiments described above can also be used in combination. For example, Embodiment 3 may be applied to Embodiment 1.

Also, the focus control in the embodiments described above is described as being a combination of TV-AF control and external (or internal) AF control. However, a plurality of types of AF control is not required in the present invention, and for example, focus control may be performed by only TV-AF control.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171235, filed Jun. 30, 2008, which is hereby incorporated by reference herein in its entirety.

What is claimed is:

1. An image capturing apparatus that performs autofocus control by moving a lens, comprising:
    a ranging unit adapted to receive split light beams by sets of sensors and measure information corresponding to a subject distance based on a phase difference of a plurality of signal waves generated by the sets of sensors;
    a detecting unit adapted to detect, in a captured image, a region including a face of a person as a face region;
    a setting unit adapted to set a focusing area with respect to the captured image;
    a generating unit adapted to generate an AF evaluation value based on a predetermined frequency range component included in the focusing area of the captured image; and
    a control unit adapted to perform focusing by moving the lens, based on the AF evaluation value generated by the generating unit,
    wherein if the face region has been detected, the setting unit sets a focusing area with respect to the face region, and
    wherein when transitioning from a state in which the face region has been detected to a state in which the face region has not been detected, if a variation between (1) a position of the lens that has been moved based on the AF evaluation value obtained from a focusing area set to the face region and (2) a position of the lens calculated from a subject distance measured by the ranging unit in the state in which the face region has not been detected is less than or equal to a predetermined threshold value, the setting unit does not change the focusing area that was set in the state in which the face region has been detected, and if the variation is greater than the predetermined threshold value, the setting unit changes the focusing area to a predetermined area in the captured image.

2. The image capturing apparatus according to claim 1, wherein if the face region has been detected, the setting unit sets a focusing area with respect to the predetermined region in addition to the face region.

3. The image capturing apparatus according to claim 2, wherein the control unit performs the focusing based on a result of adding an AF evaluation value generated with respect to the face region and an AF evaluation value generated with respect to the predetermined region.

4. The image capturing apparatus according to claim 2, wherein a center of the predetermined region and a center of the captured image are the same, and the predetermined region includes the face region.

5. An image capturing apparatus that performs autofocus control by moving a lens, comprising:
    a ranging unit adapted to receive split light beams by sets of sensors and measure information corresponding to a subject distance based on a phase difference of a plurality of signal waves generated by the sets of sensors;
    a detecting unit adapted to detect, in a captured image, a region including a face of a person as a face region;
    a setting unit adapted to set a focusing area with respect to the captured image;
    a generating unit adapted to generate an AF evaluation value based on a predetermined frequency range component included in the focusing area of the captured image; and
    a control unit adapted to perform focusing by moving the lens, based on the AF evaluation value generated by the generating unit,
    wherein if the face region has been detected, the control unit moves the focusing lens based on the AF evaluation value in the area set with respect to the face region, and
    wherein when transitioning from a state in which the face region has been detected to a state in which the face region has not been detected, if a variation between (1) a position of the lens that has been moved based on the AF evaluation value obtained from a focusing area set to the face region and (2) a position of the lens calculated from a subject distance measured by the ranging unit in the state in which the face region has not been detected is less than or equal to a predetermined threshold value, the control unit does not move the lens.

6. A control method for an image capturing apparatus that performs autofocus control by moving a lens, comprising:
    ranging step of receiving split light beams by sets of sensors and measuring information corresponding to a subject distance based on a phase difference of a plurality of signal waves generated by the sets of sensors;

detecting step of detecting, in a captured image, a region including a face of a person as a face region;

setting step of setting a focusing area with respect to the captured image;

generating step of generating an AF evaluation value based on a predetermined frequency range component included in the focusing area of the captured image; and controlling step of performing focusing by moving the lens, based on the AF evaluation value generated in the generating step, wherein if the face region has been detected, a focusing area is set with respect to the face region in the setting step, and wherein when transitioning from a state in which the face region has been detected to a state in which the face region has not been detected, if a variation between (1) a position of the lens that has been moved based on the AF evaluation value obtained from a focusing area set to the face region and (2) a position of the lens calculated from a subject distance measured in the ranging step in the state in which the face region has not been detected is less than or equal to a predetermined threshold value, the focusing area that was set in the state in which the face region has been detected is not changed in the setting step, and if the variation is greater than the predetermined threshold value, the focusing area is changed to a predetermined area in the captured image in the setting step.

7. A control method for an image capturing apparatus that performs autofocus control by moving a lens, comprising:

ranging step of receiving split light beams by sets of sensors and measuring information corresponding to a subject distance based on a phase difference of a plurality of signal waves generated by the sets of sensors;

detecting step of detecting, in a captured image, a region including a face of a person as a face region;

setting step of setting a focusing area with respect to the captured image;

generating step of generating an AF evaluation value based on a predetermined frequency range component included in the focusing area of the captured image; and controlling step of performing focusing by moving the lens, based on the AF evaluation value generated in the generating step, wherein if the face region has been detected, the lens is moved in the controlling step based on the AF evaluation value in the focusing area set with respect to the face region, and wherein when transitioning from a state in which the face region has been detected to a state in which the face region has not been detected, if a variation between (1) a position of the lens that has been moved based on the AF evaluation value obtained from a focusing area set to the face region and (2) a position of the lens calculated from a subject distance measured in the ranging step in the state in which the face region has not been detected is less than or equal to a predetermined threshold value, the lens is not moved in the controlling step.

* * * * *